US011583931B2

(12) United States Patent
Carter et al.

(10) Patent No.: US 11,583,931 B2
(45) Date of Patent: Feb. 21, 2023

(54) POWDER-BED ADDITIVE MANUFACTURING DEVICES AND METHODS

(71) Applicant: General Electric Company, Schenectady, NY (US)

(72) Inventors: William Thomas Carter, Galway, NY (US); Mark Kevin Meyer, Centerville, OH (US); Andrew David Deal, Niskayuna, NY (US); Mark Allen Cheverton, Malta, NY (US); Smara Jyoti Kalita, Cincinnati, OH (US); Michael Francis Xavier Gigliotti, Glenville, NY (US)

(73) Assignee: General Electric Company, Schenectady, NY (US)

( * ) Notice: Subject to any disclaimer, the term of this patent is extended or adjusted under 35 U.S.C. 154(b) by 825 days.

(21) Appl. No.: 16/420,683

(22) Filed: May 23, 2019

(65) Prior Publication Data
US 2020/0023631 A1    Jan. 23, 2020

Related U.S. Application Data

(62) Division of application No. 14/837,059, filed on Aug. 27, 2015, now Pat. No. 10,343,392.

(51) Int. Cl.
*B22F 12/00* (2021.01)
*C21D 1/42* (2006.01)
(Continued)

(52) U.S. Cl.
CPC .............. *B22F 12/00* (2021.01); *B22F 12/17* (2021.01); *B22F 12/30* (2021.01); *B22F 12/38* (2021.01);
(Continued)

(58) Field of Classification Search
CPC .......... B22F 12/17; B22F 12/38; B22F 12/90; B22F 12/30; B33Y 50/02
See application file for complete search history.

(56) References Cited

U.S. PATENT DOCUMENTS 6,049,978 A    4/2000   Arnold
6,355,086 B2   3/2002   Brown et al.
(Continued)

FOREIGN PATENT DOCUMENTS

CN         1658990 A      8/2005
CN       101869986 A     10/2010
(Continued)

OTHER PUBLICATIONS

Das et al., "Direct laser fabrication of superalloy cermet abrasive turbine blade tips," Materials & Design, ScienceDirect, Apr. 1, 2000, vol. 21, Issue 2, pp. 63-73.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

The disclosure relates to an apparatus for manufacturing a metallic component, and corresponding methods. The apparatus may include a build plate with a build surface and an aperture. The apparatus may also include an actuator operable to translate a metallic component such that an end portion of the metallic component is positioned within the aperture of the build plate and below the build surface. The apparatus may further include a seal coupled within the aperture of the build plate and configured to engage the end portion of the metallic component. The aperture of the build plate, the seal, and the end portion of the metallic component may cooperate to form a powder bed to hold metallic powder therein. The apparatus may also include an external heat
(Continued)

control mechanism operable to form a predetermined temperature profile of the end portion of the component to prevent cracking of the component.

20 Claims, 8 Drawing Sheets

(51) Int. Cl.

| | | |
|---|---|---|
| *B33Y 10/00* | (2015.01) | |
| *B33Y 30/00* | (2015.01) | |
| *B33Y 80/00* | (2015.01) | |
| *B22F 12/17* | (2021.01) | |
| *B22F 12/30* | (2021.01) | |
| *B22F 12/90* | (2021.01) | |
| *B33Y 50/02* | (2015.01) | |
| *B22F 7/06* | (2006.01) | |
| *B22F 5/04* | (2006.01) | |
| *B22F 10/10* | (2021.01) | |

(52) U.S. Cl.
CPC .............. *B22F 12/90* (2021.01); *B33Y 10/00* (2014.12); *B33Y 30/00* (2014.12); *B33Y 80/00* (2014.12); *C21D 1/42* (2013.01); *B22F 5/04* (2013.01); *B22F 7/062* (2013.01); *B22F 10/10* (2021.01); *B22F 2999/00* (2013.01); *B33Y 50/02* (2014.12); *Y02P 10/25* (2015.11)

(56) References Cited

U.S. PATENT DOCUMENTS

| | | |
|---|---|---|
| 7,043,819 B1 | 5/2006 | Arnold |
| 7,810,237 B2 | 10/2010 | Lange et al. |
| 8,123,489 B2 | 2/2012 | Udall et al. |
| 8,181,891 B2 | 5/2012 | Ziminsky et al. |
| 2009/0283501 A1 | 11/2009 | Erikson et al. |
| 2010/0028158 A1 | 2/2010 | Richter |
| 2010/0151145 A1 | 6/2010 | Richter et al. |
| 2011/0217457 A1 | 9/2011 | Huttner et al. |
| 2011/0311389 A1 | 12/2011 | Ryan et al. |
| 2012/0222306 A1 | 9/2012 | Mittendorf et al. |
| 2013/0004680 A1 | 1/2013 | Godfrey et al. |
| 2013/0195673 A1 | 8/2013 | Godfrey et al. |
| 2013/0287590 A1 | 10/2013 | Neuhaeusler et al. |
| 2016/0074965 A1* | 3/2016 | Jakimov ................ B22F 10/31 219/76.12 |

FOREIGN PATENT DOCUMENTS

| | | | |
|---|---|---|---|
| CN | 103624259 A | 3/2014 | |
| CN | 103862042 A | 6/2014 | |
| DE | 102007036370 B3 | 10/2008 | |
| DE | 102008012063 A1 | 9/2009 | |
| DE | 102009020987 A1 | 11/2010 | |
| DE | 102009050563 A1 | 1/2011 | |
| DE | 102013213260 A1 * | 1/2015 | ............ B22F 3/1055 |
| DE | 102013213260 A1 | 1/2015 | |
| EP | 2789413 A1 | 10/2014 | |
| JP | 2005089863 A | 4/2005 | |
| JP | 2015151566 A | 8/2015 | |
| WO | 2013087515 A1 | 6/2013 | |
| WO | 2015119692 A2 | 8/2015 | |

OTHER PUBLICATIONS

Guo et al., "Additive manufacturing technology, applications and research needs," Frontiers of Mechanical Engineering, Springer Link, Sep. 1, 2013, vol. 8, Issue 3, pp. 215-243.

European Search Report and Opinion issued in connection with corresponding EP application No. 16185615.8, dated Feb. 1, 2017.

U.S. Appl. No. 61/904,183, filed Nov. 14, 2013 entitled Layered manufacturing of single crystal alloy components, Rockstroh et al.

U.S. Appl. No. 61/904,188, filed Nov. 14, 2013 entitled Turbine components with negative CTE features, Rockstroh et al.

Machine Translation and Notification of Reasons for Refusal issued in connection with corresponding JP Application No. 2016-164246, dated Dec. 19, 2017.

Machine Translation and First Office Action and Search issued in connection with corresponding CN application No. 201610744666.7 dated Feb. 2, 2018.

* cited by examiner

POWDER-BED ADDITIVE MANUFACTURING DEVICES AND METHODS

CROSS REFERENCE TO RELATED APPLICATIONS

This application is a divisional of U.S. patent application Ser. No. 14/837,059, filed Aug. 27, 2015, which is incorporated herein by reference in its entirety.

BACKGROUND

This disclosure relates generally to powder-bed additive manufacturing apparatus and methods. More particularly, this disclosure relates to powder-bed additive manufacturing apparatus and methods for forming a substantially crack-free component. Significant advances in high temperature materials have been achieved through the formulation of Co-based, Ni-based, Ti-based and Fe-based alloys, known conventionally as "superalloys." These alloys are typically primarily designed to meet mechanical property requirements, such as creep resistance and fatigue strengths. As such, modern metal alloys have found wide use in high temperature applications, such as use in gas turbine engines.

Metal alloys components, such as components of gas turbine engines, are typically cast and/or machined. Typically, a disposable core die (DCD) process is utilized to cast metal alloy components. A DCD casting method commonly entails using additive or other manufacturing methods to create a disposable shell that is utilized to form a ceramic core, and then subsequently using the ceramic core to conventionally cast the components. High pressure turbine blades are typically manufacturing utilizing such a method. However, current metal alloy component casting techniques, such as DCD, require expensive tooling and include high fabrication costs. Further, current metal alloy component casting techniques are limited in component design complexity and geometries due to draft angle limitations, the necessity to avoid overhangs, and other limitations that are inherent in the casting process.

Recently, additive manufacturing methods for making metal alloy components have emerged as alternatives to casting and machining methods. Additive manufacturing is also referred to as "layered manufacturing," "laser sintering," "reverse machining," and "3-D printing." Such terms are treated as synonyms for purposes of the present disclosure. On a basic level, additive manufacturing technologies are based on the concept of building up material in a cross-sectional layer-by-layer manner to form a 3D component. Common to additive manufacturing technologies is the use of a 3D modeling software (Computer Aided Design or CAD), machine equipment and layering material. Once a CAD sketch is produced, the machine equipment reads in data from the CAD file and uses successive layers of a desired material to fabricate the 3D component.

Unlike casting processes, additive manufacturing is not limited by the necessity to provide draft angles, avoid overhangs, etc. Additive manufacturing also simplifies and reduces the costs associated with metal alloy component manufacturing as compared to typical casting and machining methods. For example, additive manufacturing of turbine blades and other high temperature turbine components eliminates the expensive tooling needed for casting and machining, which results in significant cost and cycle time reductions.

Some specific additive manufacturing processes employ a powder bed fusion technique to fuse metal alloy powder in additive steps to produce a component. For example, some additive manufacturing processes utilize a beam of energy to fuse a layer of metal alloy powder in a powder bed in additive steps. Some examples of such powder bed additive manufacturing processes include direct metal laser sintering/fusion (DMLS)/(DMLF), selective laser sintering/fusion (SLS)/(SLF), and electron beam melting (EBM). In these processes, a layer of metal alloy powder in the powder bed is fused to an underlying partially-formed component (or a seed component) to add a new layer to the component. A new layer of metal alloy powder is deposited into the powder bed and over the previously formed layer of the partially-formed component, and the new layer of metal alloy powder is similarly fused to the component. The depositing-and-fusing procedure is repeated a number of times to produce a plurality of layers on the partially-formed component to, ultimately, form the metal alloy component.

Unfortunately, metal alloy components formed by powder bed fusion additive manufacturing techniques may experience cracking during formation (i.e., during the depositing-and-fusing procedure) and during post build processes or use. For example, some powder bed fusion additive manufacturing techniques may not maintain acceptable thermal profiles in the added layers that form the component during the build process, such as the cooling rate of a newly fused layer of metal alloy powder or a thermal gradient between a newly fused layer of metal alloy powder and an adjacent portion of the component. Unacceptable thermal profiles of the layers of a component formed by additive manufacturing tend to induce thermal stresses that have a tendency to produce cracks in the component.

Accordingly, it is desirable to provide improved additive manufacturing techniques, such as powder bed fusion additive manufacturing apparatus and methods, which reduce the tendency of the formed metal alloy component to crack—both during the build process and/or post-build. Further, it is desirable to provide metal alloy components for use in high temperature gas turbine engines quickly and efficiently. Other desirable features and characteristics of the disclosure will become apparent from the subsequent detailed description and the appended claims, taken in conjunction with the accompanying drawings and this background of the invention.

SUMMARY

In one aspect, the present disclosure provides an apparatus for manufacturing a metallic component or portion thereof. The apparatus includes a build plate including a build surface, a bottom surface and an aperture extending through the build plate between the bottom surface and the build surface. The apparatus further includes an actuator operable to translate a metallic component with respect to the build plate such that an end portion of the metallic component is positioned within the aperture of the build plate and below the build surface. The apparatus also includes a seal coupled within the aperture of the build plate and configured to engage the end portion of the metallic component. The apparatus further includes an external heat control mechanism positioned proximate to the bottom surface of the build plate and operable to form a predetermined temperature profile of the end portion to prevent cracking of the component. The aperture of the build plate, the seal, and the end portion of the metallic component cooperate to form a powder bed configured to hold metallic powder of a predetermined composition therein.

In some embodiments, the aperture of the build plate includes a first cross-section that defines an area that is not greater than 135% of an area defined by a second cross-section of the end portion of the metallic component. In some embodiments, the external heat control mechanism is in a fixed positional relationship with respect to the build plate. In some embodiments, the build plate is non-metallic. In some embodiments, the apparatus further includes a temperature feedback mechanism that controls the temperature of the end portion via the external heat control mechanism according to the temperature profile. In some such embodiments, the temperature feedback mechanism includes a temperature measuring device that measures the temperature of the end portion.

In some embodiments, the seal seals off the aperture with respect to at least the metallic powder within the powder bed. In some embodiments, the apparatus further includes a directed energy source operable to produce an energy beam suitable for fusing the metallic powder in the powder bed on the end portion of the metallic component. In some such embodiments, the apparatus further includes a beam directing mechanism operable to direct the energy beam over the metallic powder in a pattern corresponding to a cross-sectional layer of the metallic component. In some embodiments, the apparatus further includes an airtight build enclosure forming a substantially oxygen-free atmosphere, wherein at least the powder bed is positioned within the substantially oxygen-free atmosphere.

In some embodiments, the apparatus further includes a source of the metallic powder of the predetermined composition, and a transfer mechanism operable to transfer metallic powder from the source and substantially fill the powder bed with the metallic powder. In some embodiments, the external heat control mechanism includes at least one induction coil extending about the metallic component when the metallic component is positioned within the aperture. In some such embodiments, the build plate is formed of an electrical insulating material that is operable to prevent the at least one induction coil from heating the build plate to a sintering temperature of the metallic powder.

In another aspect, the present disclosure provides a method of manufacturing a component or portion thereof. The method includes translating a component with respect to a build plate including a build surface, a bottom surface, an aperture extending between the build surface and the bottom surface, and a seal coupled within the aperture such that an end portion of the component is in engagement with the seal and positioned within the aperture below the build surface. The method further includes depositing metallic powder of a predetermined composition into the aperture of the build plate and over the seal and the end portion of the component. The method also includes directing a beam from a directed energy source to fuse a portion of the deposited metallic powder in a pattern to form a cross-sectional layer of the component on the end portion. The method further includes forming a temperature profile of the formed cross-sectional layer with an external heat control mechanism positioned below the bottom surface of the build plate to prevent cracking of the component.

In some embodiments, the translating the component, the depositing the metallic powder, the directing the beam from the directed energy source, and the forming the temperature profile form a cycle, and the method further includes performing the cycle a plurality of times to add a plurality of layers to the component. In some embodiments, the build plate is non-metallic, the external heat control mechanism includes at least one induction coil extending about the metallic component, and the seal prevents the deposited metallic powder from passing through the aperture. In some embodiments, the aperture of the build plate, the seal, and the end portion of the metallic component cooperate to form a powder bed that holds the deposited metallic powder. In some embodiments, the component is a turbine blade, and the formed cross-sectional layer is a portion of a tip portion of the turbine blade.

In another aspect, the present disclosure provides a method of forming a tip portion of a turbine blade. The method includes translating a turbine blade base portion with respect to a build plate including a build surface, a bottom surface, an aperture extending between the build surface and the bottom surface, and a seal coupled within the aperture such that an end portion of the turbine blade base is in engagement with the seal and positioned within the aperture below the build surface. The method further includes depositing metallic powder into the aperture of the build plate and over the seal and the end portion of the turbine blade base portion. The method also includes directing a beam in a pattern from a directed energy source to fuse a layer of the deposited metallic powder to the end portion to form a portion of a tip portion on the turbine blade base portion. The method further includes forming a temperature profile of the formed cross-sectional layer with an external heat control mechanism proximate to the bottom surface of the build plate to prevent cracking of the end portion.

In some embodiments, the translating the turbine blade base, the depositing the metallic powder, the directing the beam from the directed energy source, and the forming the temperature profile form a cycle, and the method further includes performing the cycle a plurality of times to form the tip portion on the turbine blade base portion in a layer by layer fashion. In some embodiments, the method further includes forming the turbine blade base portion by removing a preexisting tip portion from the turbine blade base portion. In some embodiments, the build plate is non-metallic, and the external heat control mechanism comprises at least one induction coil extending about the metallic component and arranged in a fixed positional relationship with respect to the build plate. In some embodiments, the seal is operable to prevent at least the deposited metallic powder from passing through the aperture.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the disclosure, is particularly pointed out and distinctly claimed in the claims at the conclusion of the specification. The foregoing and other features, aspects, and advantages of the disclosure will be readily understood from the following detailed description taken in conjunction with the accompanying drawings, wherein:

DETAILED DESCRIPTION

Figure 1:
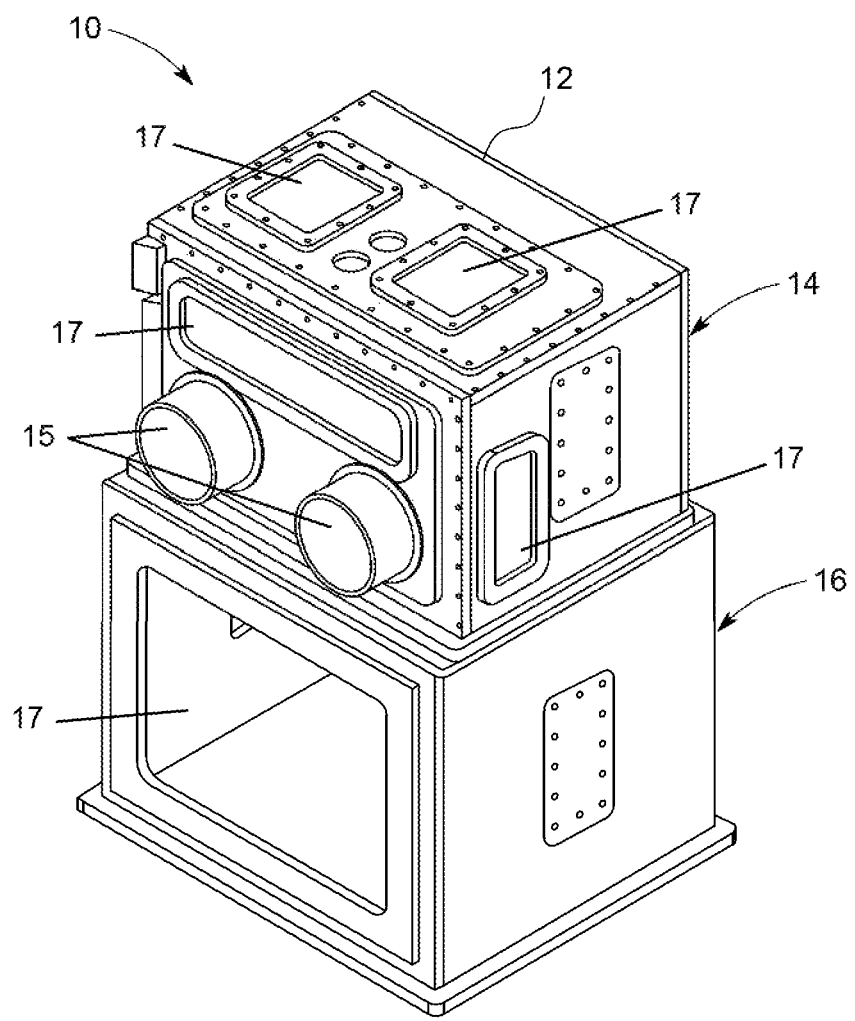
FIG. 1 depicts a perspective view of a build enclosure of an exemplary additive manufacturing apparatus according to the present disclosure.
Figure 2:
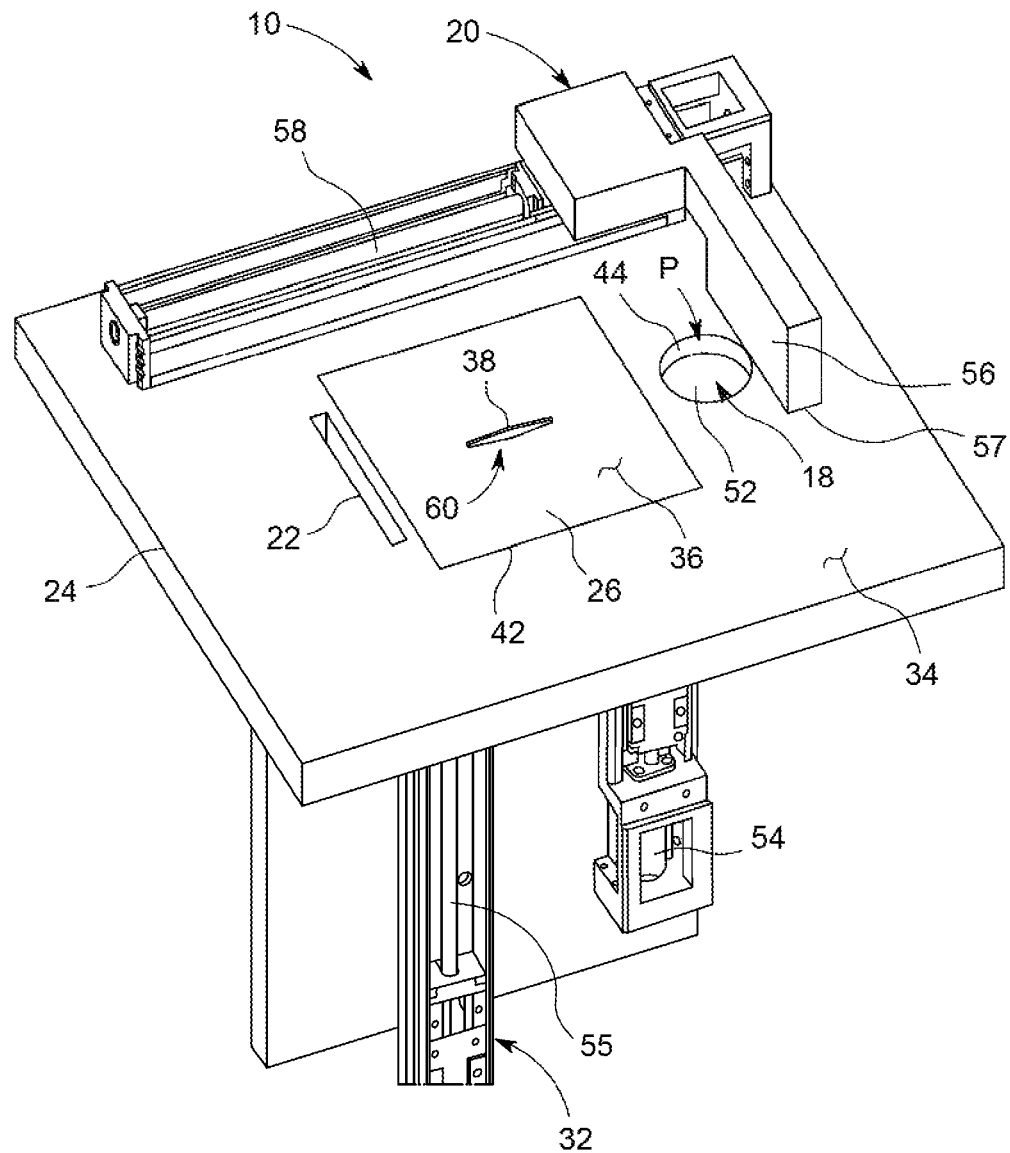
FIG. 2 depicts a perspective view of exemplary components of the additive manufacturing apparatus of FIG. 1.
Figure 3:
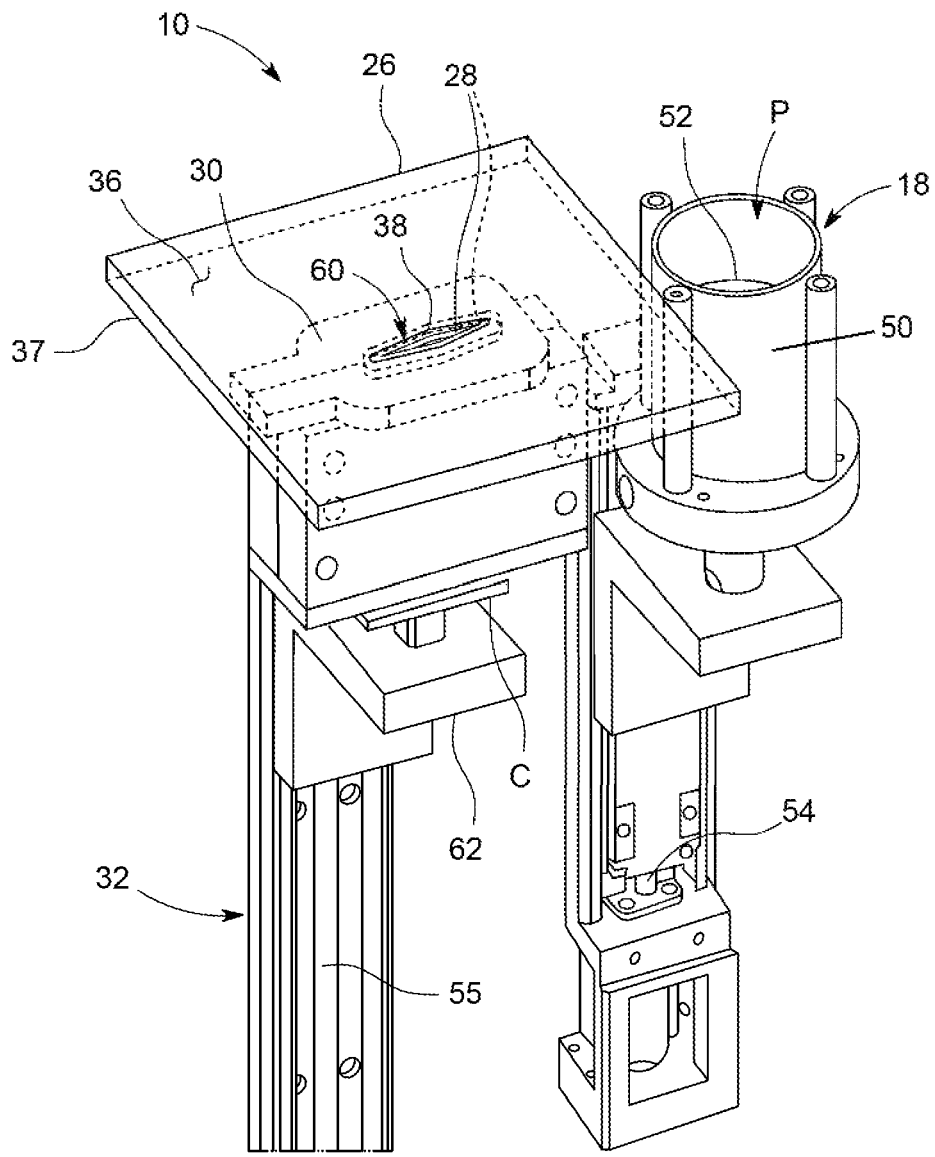
FIG. 3 depicts a perspective view of exemplary components of the additive manufacturing apparatus of FIG. 1 forming a component.
Figure 4:
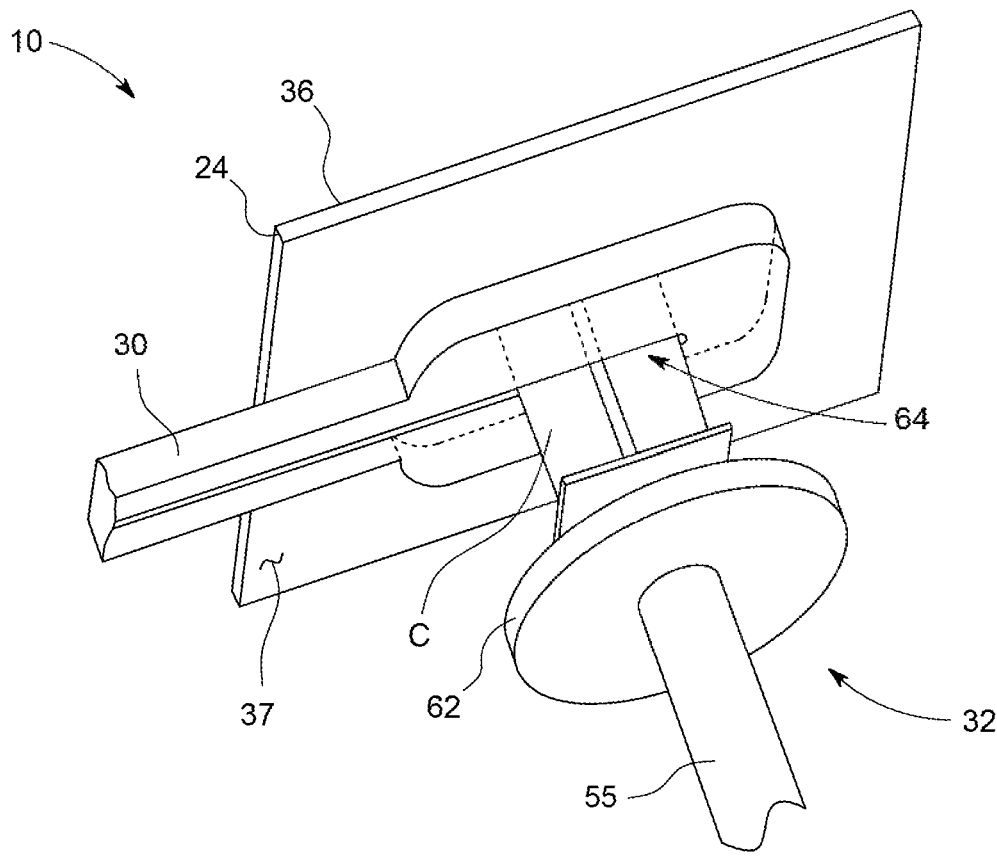
FIG. 4 depicts a perspective view of exemplary components of the additive manufacturing apparatus of FIG. 1 forming a component.

Reference will be made below in detail to exemplary embodiments of the disclosure, examples of which are illustrated in the accompanying drawings. Wherever possible, the same reference numerals used throughout the drawings refer to the same or like parts.

FIG. 1 shows an exemplary powder bed fusion additive manufacturing apparatus 10 according to the present disclosure for manufacturing or forming at least one metal alloy component that is crack-free. In one example, the component is a high temperature superalloy component that is crack-free. The term crack-free and the like is used herein to refer to the absence of thermal induced cracks in the microstructure of the layers of the metal alloy component or component portion formed by the powder bed fusion apparatus 10 after solidification thereof. In one example the apparatus 10 is able to form a metal alloy component (or portion thereof) via layers that are free of thermal induced cracks that are about 100 microns wide and spaced at approximately 100 microns apart, which tend to form with prior powder bed fusion additive manufacturing apparatuses/methods. In one example, the apparatus 10 is able to form a metal alloy component (or portion thereof) via layers that are free of thermal induced cracks that are about 100 microns wide and spaced at approximately 100 microns apart, which tend to form with prior powder bed fusion additive manufacturing apparatuses/methods. In one example, the apparatus 10 is able to form a metal alloy component (or portion thereof) via layers that are free of thermal induced cracks that are localized in a respective formed layer, such as cracks that extend through the full height/thickness of a respective formed layer, which tend to form with prior powder bed fusion additive manufacturing apparatuses/methods. In one example, the apparatus 10 is able to form a metal alloy component (or portion thereof) via layers that are free of thermal induced cracks that are sharp discontinuities between grains, which tend to form from prior powder bed fusion additive manufacturing apparatuses/methods. In one example, the apparatus 10 is able to form a metal alloy component (or portion thereof) via layers that are free of thermal induced cracks that are irregular-shaped "shrinkage cracks," which tend to form from prior powder bed fusion additive manufacturing apparatuses/methods. In some example, the apparatus 10 is able to form a metal alloy component (or portion thereof) via layers that are free of each of the thermal induced cracks described above which tend to form from prior powder bed fusion additive manufacturing apparatuses/methods.

The additive manufacturing apparatus 10 is able to carry out manufacturing methods of the present disclosure as detailed herein. The apparatus 10 in this example includes a build enclosure 12 that encloses, at least partially, components of the apparatus 10. For example, at least a powder bed (not shown) is provided within the build enclosure 12 such that fusion of metallic powder P in the powder bed occurs in a defined environment. In some embodiments, the build enclosure 12 defines an atmosphere that is substantially oxygen-free. In some embodiments, the build enclosure 12 defines an inert atmosphere (e.g., an argon atmosphere). In further embodiments, the build enclosure 12 defines a reducing atmosphere to minimize oxidation.

As shown in FIG. 1, the build enclosure 12 includes a first air-tight zone 14 that defines the environment in which the fusion of metallic powder P in the powder bed occurs. The build enclosure 12 may also include a second zone 16 that may or may not be air-tight, and in one example defines an environment that is in communication with the first zone 14. In some such embodiments, as discussed further below with respect to FIGS. 5-9, a seal (not shown) of the apparatus 10 is effective in sealing off the first air-tight zone 14 with respect to the second zone 16. The build enclosure 12 may further include sealable or sealed visual and/or tactile accesses 15 into the interior of the build enclosure 12, as shown in FIG. 1. The build enclosure 12 may also include inputs and outputs for the entrance and egress, respectively, of metal powder "P", gases, power, cooling water, etc. into and out of the build enclosure 12. In this example there are also a plurality of windows 17 in order to view the manufacturing process. The viewing may also include one or more cameras mounted internally or externally that allows imaging.

FIGS. 2-5 illustrate components of the powder bed fusion apparatus 10 that may be positioned within the enclosure 12, as shown in the cross-sectional views of FIGS. 6-9, and that are effective in forming a metal alloy component that is substantially crack-free. As shown in FIGS. 2, 3 and 6-9, the apparatus 10 may include a powder supply mechanism 18, a powder translating mechanism 20, a build platform 24, a build plate 26, a seal 28, an external heat control mechanism 30 and a component translating mechanism 32.

The build platform 24 in one example is a rigid structure providing a planar worksurface 34. In the illustrated example as shown in FIGS. 2 and 5-9, the build platform 24 may include a build opening 42 in communication with and exposing the build plate 26, a supply opening 44 in communication with the powder supply mechanism 18, and an overflow opening 22 in communication with an overflow receptacle 45.

The build plate 26 in one example is positioned between the supply opening 44 and the overflow opening 22 of the worksurface 34 in a first direction, such as along a lateral direction X as shown in FIGS. 6-9. The build plate 26 may include a build surface 36 that is exposed by the build opening 42 of the build platform 24. The build surface 36 of the build plate 26 in one example is planar, and may be coplanar with the worksurface 34 of the build platform 24 as shown in FIGS. 2 and 5-9. In some other embodiments, the build surface 36 of the build plate 26 may be positioned below or above the worksurface 34 of the build platform 24. As shown in in FIGS. 2, 3 and 5-9, the build plate 26 may include an aperture 38 extending from the build surface 36 and through the build plate 26. As discussed further below, the aperture 38 of the build plate 26 may be in communication with, and partially form, the powder bed 60.

In one embodiment the build plate 26 may be substantially non-conductive. For example, the build plate 26 may be made from a substantially non-conductive material (e.g., alumina). In some embodiments, the build plate 26 may be ceramic, glass or otherwise non-metallic. The build plate 26 may be formed of an electrical insulating material that is operable to prevent an external heat control mechanism 30 (which is operable to form a predetermined temperature profile of the component "C", as explained below) from heating the build plate 26 to a sintering temperature of metallic powder "P" that is utilized to form layers of the component "C". In this way, the external heat control mechanism 30 is able to form a predetermined temperature profile of the component "C" to resist cracking of the component "C" without interfering with the fusion or sintering of the metallic powder "P" that forms layers of the component "C". In one example the external heat control mechanism is induction based. In other examples the external heat control mechanism is radiant or laser based (e.g., one or more heat lamp or auxiliary laser).

The powder supply mechanism 18 of the apparatus 10 in one example includes a supply container 50 configured to hold a volume of the metallic powder "P" underlying and communicating with the supply opening 44 of the build platform 24, as shown in FIGS. 2, 3 and 6-9. The powder supply mechanism 18 may also include a supply member 52 that is substantially solid and that spans across the interior of the supply container 50, as shown in FIGS. 6-9. The supply member 52 may be translatably provided within the supply container 50, and coupled to an actuator mechanism 54. The actuator mechanism 54 may be operable to selectively translate the supply member 52 through the interior of the supply container 50.

Figure 6:
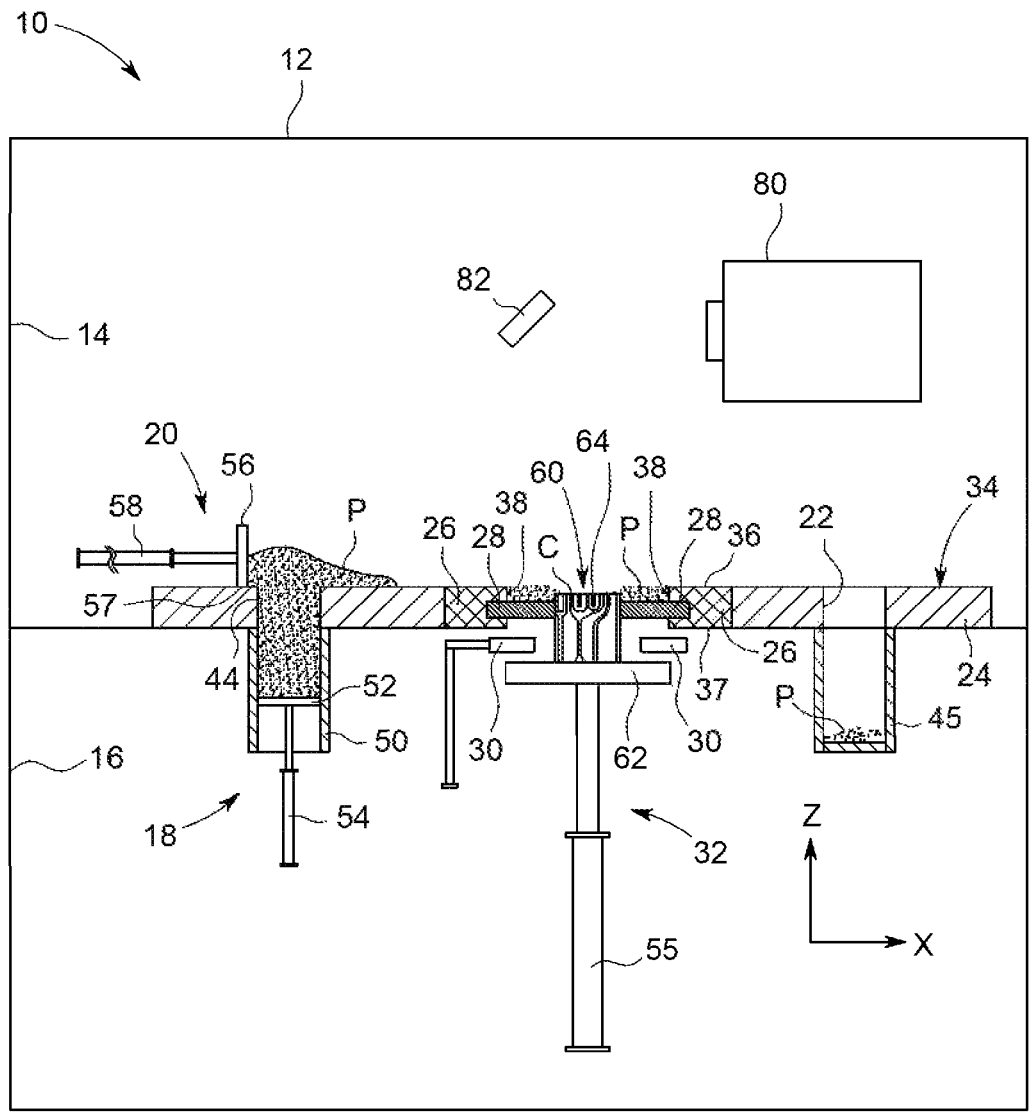
FIG. 6 depicts the additive manufacturing apparatus of FIG. 1 after a layer is formed on a component and the component has been repositioned.
Figure 7:
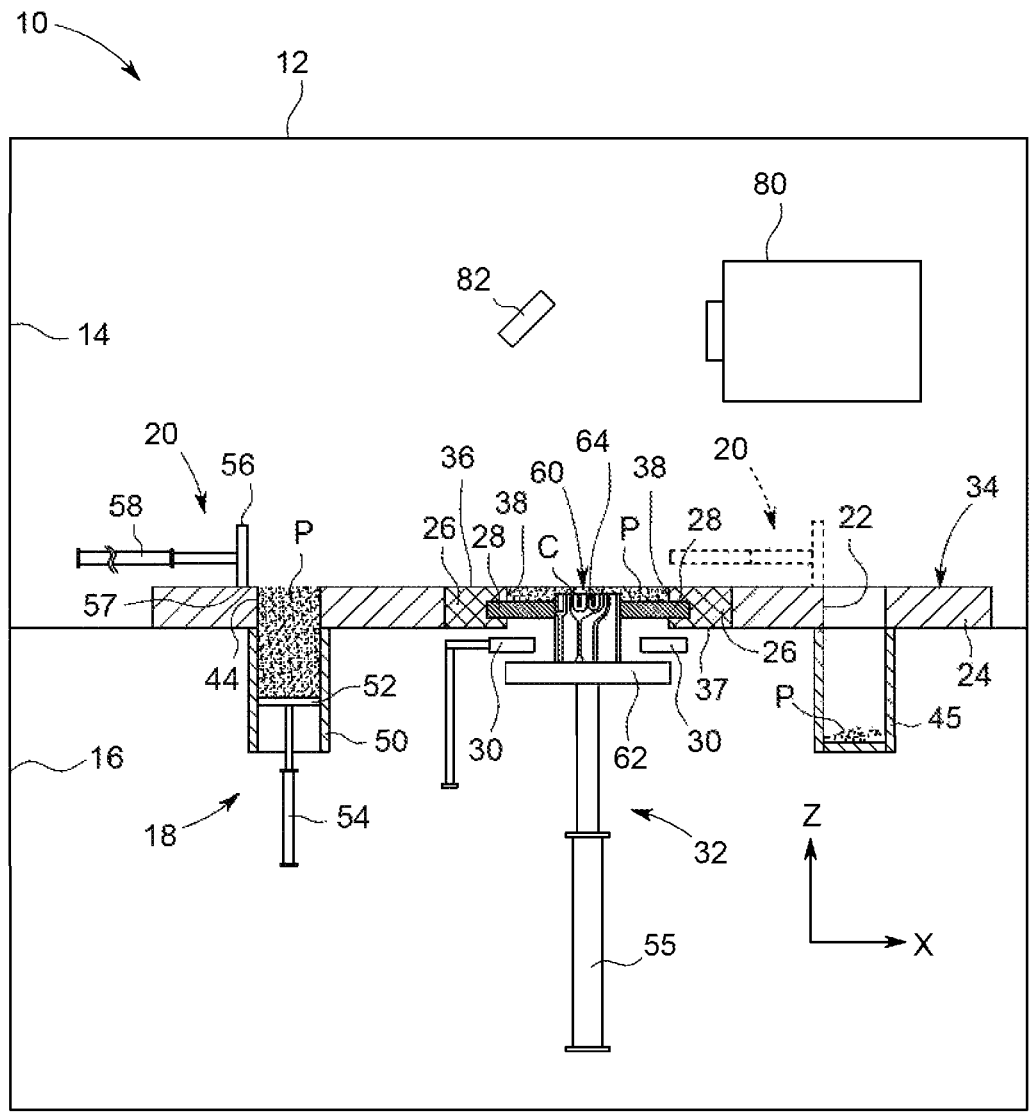
FIG. 7 depicts the additive manufacturing apparatus of FIG. 1 after a layer is formed on the repositioned component of FIG. 6 and metallic powder is deposited in a powder bed of the apparatus.
Figure 8:
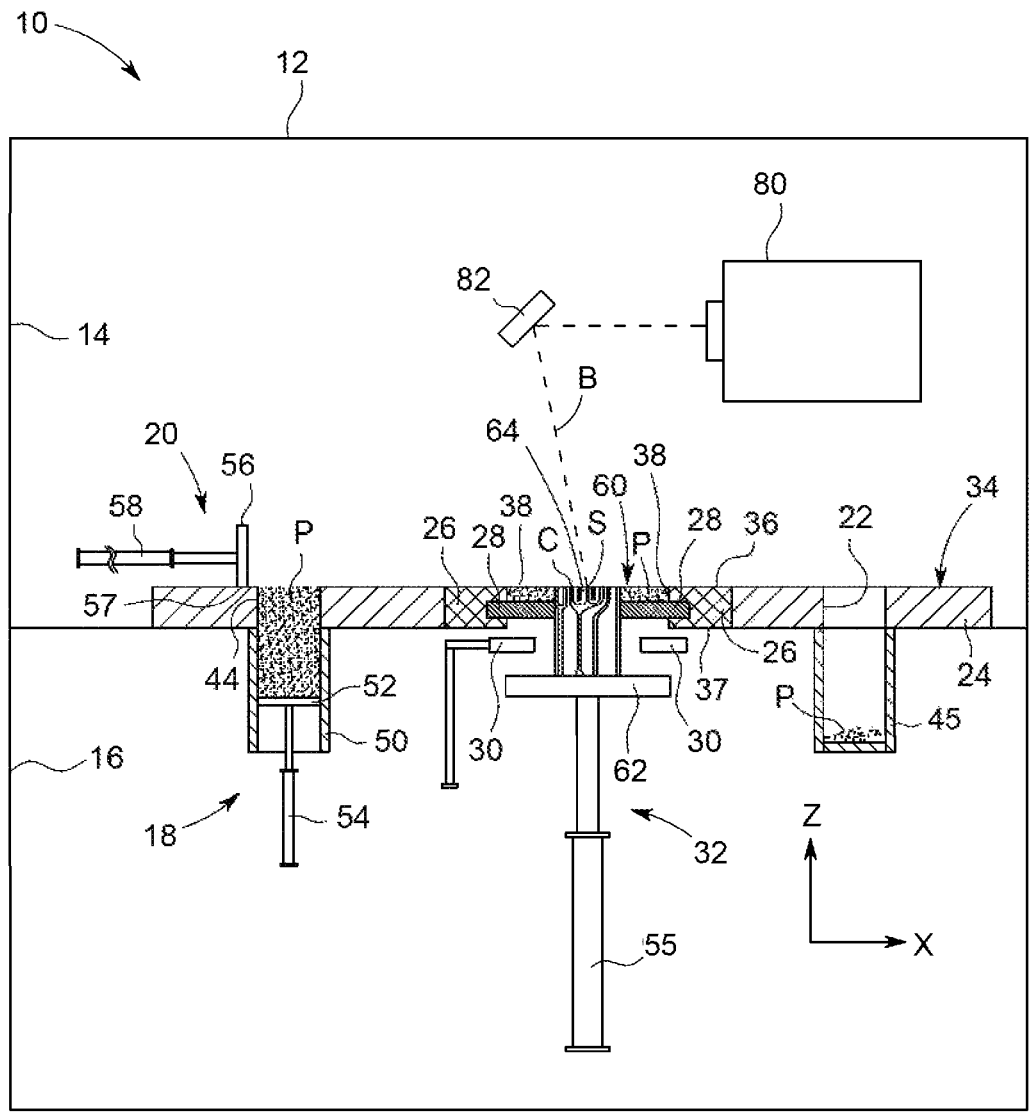
FIG. 8 depicts the additive manufacturing apparatus of FIG. 1 forming a subsequent layer on the component of FIG. 7.
Figure 9:
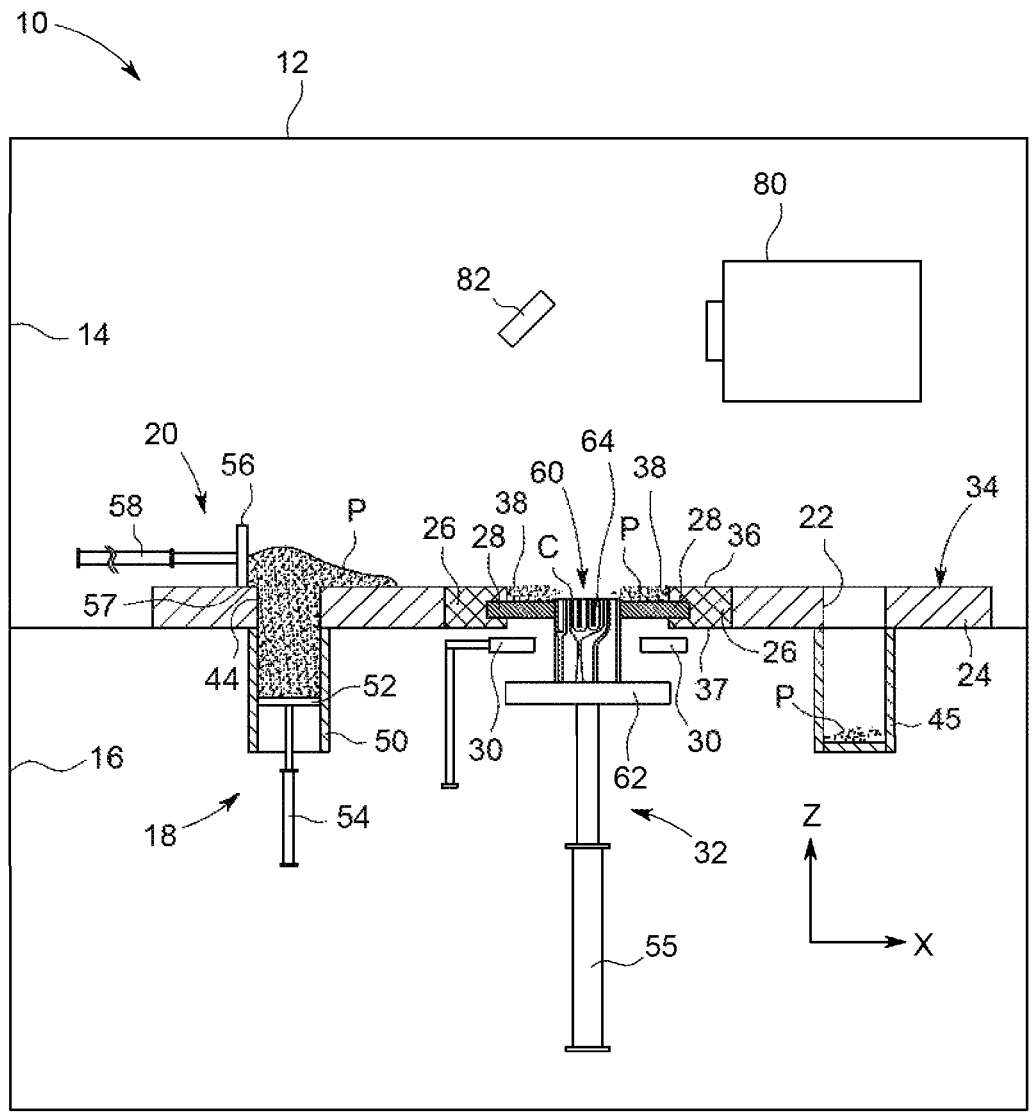
FIG. 9 depicts the additive manufacturing apparatus of FIG. 1 after the subsequent layer is formed on the component of FIG. 8 and the component has been repositioned.

When the actuator mechanism 54 positions the supply member 52 in a lowered position within the supply container 50 that is spaced from the build platform 24, a supply of metallic powder "P" of a desired metal alloy composition may be provided within the supply container 50, as shown in FIGS. 6-9. The desired metal alloy composition may be a superalloy composition, such as including a Co-based, Ni-based, Ti-based and Fe-based alloy composition. When the actuator mechanism 54 translates the supply member 52 within the supply container 50 from a lowered position towards the worksurface 34 of the build platform 24 to a pre-determined raised position, as shown in FIGS. 6 and 9, a predetermined amount of the of metallic powder "P" is pushed through the supply opening 44 and provided above and onto the build platform 24. In this way, the powder supply mechanism 18 may be operable to selectively expose a portion of the metallic powder "P" provided within the supply container 50 above the worksurface 34. While the actuator mechanism 54 is depicted schematically, one of ordinary skill in the art will appreciate that many differing mechanisms may be utilized as the actuator mechanism 54, such as pneumatic or hydraulic cylinders, ballscrew or linear electric actuators, etc.

Once the powder supply mechanism 18 has exposed some of metallic powder "P" provided from the supply container 50 above and onto the worksurface 34 of the build platform 24, as shown in FIGS. 6 and 9, the powder translating mechanism 20 is operable to translate the exposed metallic powder "P" over the worksurface 34 of the build platform 24 and the build surface 36 of the build plate 26. For example, as shown in FIG. 2 and FIGS. 6-9 the powder translating mechanism 20 in one example includes a powder engagement member 56 and an actuator mechanism 58. The powder engagement member 56 may be a rigid elongated member that is provided above the worksurface 34 and the build surface 36. A bottom edge 57 of the powder engagement member 56 in this example is in close proximity to the worksurface 36 and/or build surface 36. In a further example the bottom edge 57 may abut and be coplanar with the worksurface 34 (and/or the build surface 36, depending upon its position), as shown in FIGS. 2 and 6-9. In other embodiments (not shown), the bottom edge 57 of the powder engagement member 56 may be spaced from the worksurface 34 (and/or the build surface 36) and/or angled with respect to the worksurface 34 (and/or the build surface 36).

The actuator mechanism 58 of the powder translating mechanism 20 may be operable to selectively translate the powder engagement member 56 with respect to a starting position with the powder supply mechanism 18 and the exposed metallic powder "P" positioned between the actuator mechanism 58 and the build surface 36 of the build plate 26, as shown in FIGS. 6 and 9. From the starting position, the actuator mechanism 58 may translate the powder engagement member 56 into engagement with the exposed metallic powder "P" and over the supply opening 44, and then further translate the engagement member 56 and the engaged metallic powder "P" along the worksurface 34 of the build platform 24, across the aperture 38 of the build plate 26, and at least to the overflow opening 22, as shown in FIG. 7.

As the metallic powder "P" is pushed across the aperture 38 of the build plate 26 by the engagement member 56, the metallic powder "P" is able to fall through the aperture 38 and into the powder bed 60. In this way, the powder translating mechanism 20 may be operable to deposit the metallic powder "P" through the aperture 38 of the build plate 26 and into the powder bed 60. The powder supply mechanism 18 may be configured to expose at least a sufficient amount of metallic powder "P" such that the supply mechanism 18 fills the powder bed 60 with the metallic powder "P". After the powder bed 60 is filled with the metallic powder "P", any excess or unused metallic powder "P" carried by the powder translating mechanism 20 may be pushed by the powder supply mechanism 18 past the aperture 38 of the build plate 26 and to the overflow opening 22. The excess metallic powder "P" may thereby be deposited into the overflow receptacle 45, which serves as a repository for the excess powder "P". While the actuator mechanism 58 is depicted schematically, one of ordinary skill in the art will appreciate that many differing mechanisms may be utilized as the actuator mechanism 58, such as pneumatic or hydraulic cylinders, ballscrew or linear electric actuators, etc.

As discussed above, in some embodiments the bottom edge 57 of the powder engagement member 56 may abut the worksurface 34 and/or the build surface 36. As a result, as the powder engagement member 56 translates the metallic powder "P" across the worksurface 34 and the build surface 36, the metallic powder "P" may be prevented from being deposited on the worksurface 34 and/or the build surface 36. However, in alternative embodiments the bottom edge 57 of the powder engagement member 56 may be spaced from the worksurface 34 and/or the build surface 36, such as up to about 250 microns. In such embodiments, as the powder engagement member 56 translates the metallic powder "P" across the worksurface 34 and the build surface 36, the powder supply mechanism 18 may form a layer of metallic powder "P" on the worksurface 34 and/or the build surface 36, such as a layer that is positioned above and about the aperture 38 on the build surface 36.

As shown in FIGS. 3-9, the component translating mechanism 32 of the apparatus 10 in one example includes a component engagement mechanism 62 and a component actuator 55. The component engagement mechanism 62 may be removably coupled to a component "C". The component actuator 55 may be operable to translate the component translating mechanism 32, and thereby the component "C", with respect to the build plate 26. Specifically, the component translating mechanism 32 may be positioned below a bottom surface 37 of the build plate 26 that substantially opposes the build surface 36, and be operable to translate the component "C" coupled thereto with respect to the build plate 26, such as along a vertical direction Z as indicated in FIGS. 6-9.

The component translating mechanism 32 may be operable to position the component "C" such that an end portion 64 of the component "C" is positioned within the aperture 38 of the build plate 26, as shown in FIGS. 3-9. In this way, the component translating mechanism 32 may be effective to position the end portion 64 of the component "C" within the aperture 38 of the build plate 26, and lower the component "C" therefrom after a new layer is fused on the tip or free end of the end portion 64 to prepare the partially formed component "C" for the formation of an additional layer. For example, after a first layer is formed on the end portion 64 of the component "C", the component translating mechanism 32 may lower the component "C" within the range of about 10 microns to about 250 microns (e.g., about 30 microns to about 50 microns) with respect to the build plate 26 to position the end portion 64 within the aperture 38 and prepare the component "C" for the formation of a second next layer, as described herein. It is noted that the layer increment affects the speed of the additive manufacturing process and the resolution of the portion of the component "C" formed by the layers. While the component actuator 55 is depicted schematically, one of ordinary skill in the art will appreciate that many differing mechanisms may be utilized as the component actuator 55, such as pneumatic or hydraulic cylinders, ballscrew or linear electric actuators, etc. In one example the apparatus 10 is configured such that thickness of a layer of powder "P" formed on the end portion 64 of the component "C", and thereby the thickness of a layer formed on the end portion 64 therefrom, is within the range of about 1 micron to about 250 microns, within the range of about 10 microns to about 50 microns, or within the range of about 30 microns to about 50 microns. The term "end portion 64" is used herein to refer generally to the free end and a portion proximate thereto of a component "C" at a particular point in time during a manufacturing process thereof. A subsequent layer formed on an existing end portion 64 portion thereby forms at least a portion of a new end portion 64 of the component "C." The end portion 64 at a particular point in time during a manufacturing process of a component "C" may be any portion of a resulting or as-manufactured component "C," such as a base portion, medial portion or tip portion of a resulting component "C." The term end portion 64 is thereby not used herein in a limiting sense with respect to the portion(s) of a component "C" formed by the layers deposited by the apparatus 10.

The external heat control mechanism 30 of the apparatus 10 in one example is positioned proximate to the bottom surface 37 of the build plate 26, as shown in FIGS. 3-9. In some embodiments, as shown in FIGS. 5-9 the external heat control mechanism 30 may be spaced from the bottom surface 37 of the build plate 26. In another embodiment, the external heat control mechanism 30 may abut the bottom surface 37 of the build plate 26. The external heat control mechanism 30 in one example is arranged in a fixed positional relationship with respect to the build plate 26. In one example, the external heat control mechanism 30 may be positioned as close as possible to the formation of the new layer on the end portion 64 of the component "C" to control the temperature profile thereof (as explained further herein). For example, the external heat control mechanism 30 may be positioned as close as possible to the bottom surface 37 of the build plate 26. In one example, the external heat control mechanism 30 may be positioned proximate to the bottom surface 37 of the build plate 26 and include soft magnetic material that is configured to concentrate flux toward the end portion 64 of the component "C" to control the temperature profile of the layers formed thereon. As shown in FIGS. 3-9 the external heat control mechanism 30 may form an interior space or void that is substantially aligned with the aperture 38 of the build plate 26 (e.g., in the vertical direction). The component "C" may extend through the interior space or void of the external heat control mechanism 30 and into the aperture 38 of the build plate 26. Stated differently, a portion of the external heat control mechanism 30 may extend at least partially about the component "C". The component translating mechanism 32 may thereby be operable to translate the component "C" with respect to the external heat control mechanism 30 (and the build plate 26).

The external heat control mechanism 30 may be operable to form a predetermined temperature profile of the end portion 64 of the component "C". For example, the external heat control mechanism 30 in one example includes at least one induction coil that substantially surrounds the metallic component "C" when the metallic component "C" is positioned within the aperture 38 of the build plate 26. As the metallic component "C" is conductive, the at least one induction coil of the external heat control mechanism 30 is able to control the temperature of the component "C" as electric current is passed through the coil and a magnetic field is created. Further, as the external heat control mechanism 30 is positioned proximate to the bottom surface 27 of the build plate 26, the external heat control mechanism 30 is capable of controlling the temperature of the end portion 64 of the component "C" to ensure that the layers of the component "C" formed by the metallic powder "P" are not cracked. In this way, the external heat control mechanism 30 is operable to form a predetermined temperature profile of the end portion 64 to prevent cracking of the component "C".

In one example, a predetermined temperature profile of an end portion 64 of a particular component "C" is a predetermined cooling profile of at least one newly formed layer making up the end portion 64 from the sintering or fusion temperature of the at least one layer to the solidification temperature thereof (e.g., about 1,300 degrees Celsius, depending upon the composition of the metal alloy powder "P") such that, at least upon solidification, the at least one layer is crack-free. The predetermined temperature profile of a newly formed layer, such as a predetermined cooling profile from the sintering or fusion temperature to the solidification temperature thereof, that results in the solidified layer being crack free may be empirically determined, experimentally determined or a combination thereof. In some embodiments, the predetermined temperature profile of an end portion 64 of a particular component "C" may be a range of predetermined cooling profiles of at least one newly formed layer making up the end portion 64 from the sintering or fusion temperature to the solidification temperature thereof such that, at least upon solidification, the at least one layer is crack-free. A particular temperature profile for an end portion 64 of a particular component "C" made from at least one formed layer that is effective in preventing cracks in the at least one layer at least upon solidification may be influenced or depend (at least in part) by a number of factors, such the composition of the metallic powder "P", the thickness of the at least one layer, the shape/configuration of the at least one layer, the initial temperature of the at least one layer (i.e., the fusion temperature), the solidification temperature of the at least one layer, the temperature gradient between the at least one layer and the preceding and/or subsequent layer or formed portion, the desired microstructure of the at least one layer after solidification, the ultimate operating parameter of the component "C", the desired speed of the formation of the at least one layer (i.e., the movement of the component by the translating mechanism 32), etc. In one example, the apparatus 10 forms or applies the predetermined temperature profile to an end portion 64 of a particular component "C," (e.g., to at least one newly formed layer), such as a cooling profile from fusion to solidification, by use of at least the external heat control mechanism 30 and the component translating mechanism 32 (to translate the component "C" with respect to the external heat control mechanism 30).

Figure 5:
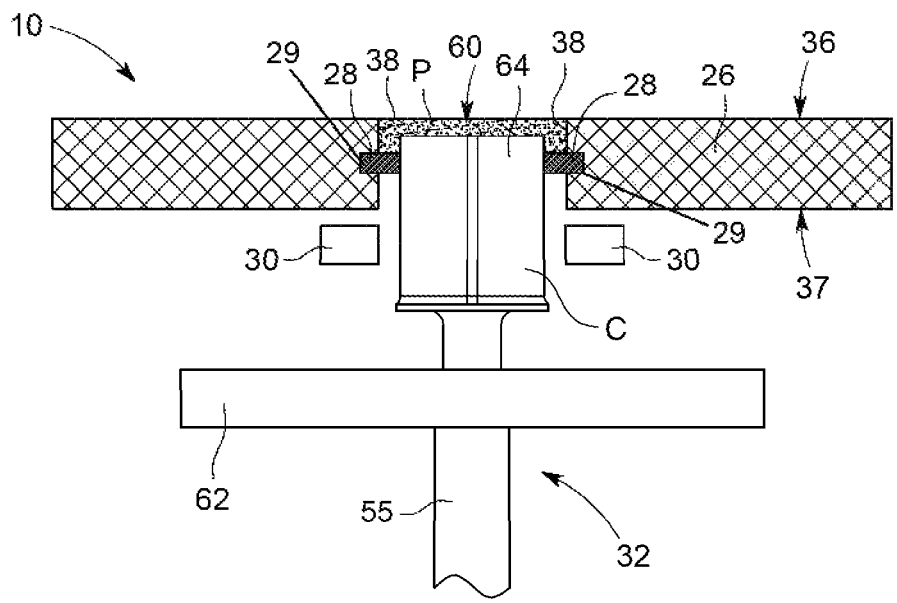
FIG. 5 depicts a cross-sectional view of exemplary components of the additive manufacturing apparatus of FIG. 1 forming a component.

The seal 28 of the apparatus 10 may be coupled within the aperture 38 of the build plate 26 and configured to engage the end portion 64 of the component "C", as shown in FIGS. 5-9. For example, the seal 28 may be provided within the aperture 38 between the build surface 36 and the bottom surface 37. In some embodiments, the seal 28 may be provided within a recess or slot 29 formed in the aperture 38 between the build surface 36 and the bottom surface 37, as shown in FIG. 5. In some embodiments, the seal 28 may be provided below the build surface 36 and/or above the bottom surface 37 of the build plate 26.

The seal 28 may be substantially solid and engaged the build plate 26 and the end portion 64 of the build plate 26 such that the seal 28 seals off the aperture 38 with respect to at least the metallic powder "P" within the powder bed 60, as shown in FIG. 5. In some embodiments, the seal 28 may also be configured to seal off the first zone 14 with respect the second zone 16 of the enclosure such that the first zone 14 is substantially air-tight and defines an atmosphere about the fusion of the metallic powder "P".

The seal 28 in one example is substantially non-conductive. For example, the seal 28 may be made from a substantially non-conductive material (e.g., a non-metallic material). In some embodiments, the seal 28 may be ceramic or glass. The seal 28 may be formed of an electrical insulating material that is operable to prevent the induction-based external heat control mechanism 30 from heating the seal 28 to a sintering temperature of the metallic powder "P" within the powder bed 60. In one example the external heat control mechanism 30 employs a temperature feedback control mechanism that controls the temperature of the end portion 64 via the external heat control mechanism 30 according to the temperature profile. The temperature feedback control mechanism may include a temperature measuring device that measures the temperature of the end portion 64, such as via infrared (IR) pyrometry, a thermal camera or any other mechanism. The temperature measuring device may determine the temperature of the end portion 64, and the temperature feedback control mechanism may control the external heat control mechanism 30 based on the determined temperature to apply more or less heat to the end portion 64 according to the temperature profile. In this way, the temperature feedback control mechanism of the external heat control mechanism 30 may allow for accurate control of the external heat control mechanism 30 to maintain the appropriate temperature profile. The external heat control mechanism 30 may thereby be able to adjust real time to ensure the layers formed by the apparatus 10 include a temperature profile that prevents the formation of cracks therein.

In some embodiments, the seal 28 may be shaped and otherwise configured to engage a particular end portion 64 of a component "C" and/or a particular aperture 38 of the build plate 26. In other embodiments, the seal 28 may be able to adapt or conform to differing shaped end portions 64 and/or apertures 38. The seal 28 may be any design or configuration that engages the build plate 26 (e.g., within the aperture 38) and the end portion 64 of the component "C" and prevents at least the metallic powder "P" from passing through the aperture 38. For example, the seal 28 may include ceramic fibers (e.g., a ceramic wool) extending between the aperture 38 and the end portion 64, such as a labyrinth seal design, spring loaded ceramic plates, or any other design or aspects to seal off the aperture 38 from at least the metallic powder "P". The seal 28 may be stationary with respect to the component "C", or the seal 28 may move relative the component "C". In one example the seal 28 may include a component engagement portion or mechanism that is configured to engage the end portion 64 of the component "C," and a plate engagement portion or mechanism configured to engage the component engagement portion and the build plate 26.

As shown in FIGS. 5 and 7, the aperture 38 of the build plate 26, the seal 28, and the end portion 64 of the metallic component "C" may cooperate to form the powder bed 60 that holds the metallic powder "P" of the predetermined composition. The end portion 64 of the metallic component "C" may be positioned below the build surface 36. The powder bed 60 may thereby extend at least between the inner walls or sides of the aperture 38 of the build plate 26, and over the seal 28 and the portion of the end portion 64 of the metallic component "C" extending past the seal 28, as show in FIG. 5. In this way, the aperture 38 of the build plate 26, the seal 28, and the end portion 64 of the metallic component "C" may cooperate to form the powder bed 60 that holds the metallic powder "P" of the predetermined composition therein. The powder bed 60 of the apparatus 10 is thereby advantageously relatively small and concentrated to the location of the formation of the layers on the end portion 64 of the component "C" by the metallic powder "P".

As also shown in FIG. 5, if the powder supply mechanism 18 abuts the build surface 36 as it fills the powder bed 60 with the metallic powder "P", the powder bed 60 may only extend to the build surface 36. If the powder supply mechanism 18 is spaced from the build surface 36 as it fills the powder bed 60 with the metallic powder "P", the powder bed 60 may extend past the build surface 36 (not shown). The relative positioning of the tip or end of the end portion 64 of the metallic component "C" with respect to the build surface 36 or the powder supply mechanism 18 may thereby determine the depth or thickness of the metallic powder "P" in the powder bed 60 positioned on or above the end portion 64 of the metallic component "C", and thereby the thickness of the layers formed on the end portion 64 from the metallic powder "P" (as described further below). In some embodiments, the component translating mechanism 32 may position the component "C" such that the thickness of the metallic powder "P" in the powder bed 60 positioned on or above the end portion 64 of the component "C", and thereby the thickness of a layer formed on the end portion 64 from the metallic powder "P", may be within the range of about 10 microns to about 50 microns (e.g., about 30 microns).

As the configuration of the powder bed 60 may be related to the configuration (e.g., shape, size, etc.) of the aperture 38 of the build plate 26, in some embodiments the aperture 38 may be configured to minimize the size of the powder bed 60, and thereby the amount of "used" metallic powder "P" during the formation of the component "C. For example, in some embodiments the aperture 38 of the build plate 26 includes a first cross-section that defines an area that is not greater than 135% of a corresponding area defined by a second cross-section of the end portion 64 of the metallic component "C". In some other embodiments, the aperture 38 of the build plate 26 includes a first cross-section that defines an area that is not greater than 125%, or 115%, of a corresponding area defined by a second cross-section of the end portion 64 of the metallic component "C". In some embodiments, the aperture 38 of the build plate 26 may mimic or otherwise correspond to the configuration of the end portion 64 of the metallic component "C" (and/or a desired configuration of the layers formed on the end portion 64). For example, if the component "C" is a turbine blade, the aperture 38 (and, potentially, the seal 28) may be shaped at least similar to the shape of a desired tip portion of the turbine blade (e.g., an airfoil shape), or base portion of the turbine blade, to minimize the size or volume of the powder bed 60 (and thereby the amount of metallic powder "P" used to form the tip portion of the turbine blade).

FIGS. 6-9 illustrate additional exemplary components of the apparatus 10, and an exemplary method of utilizing the apparatus 10 to form layers on an end portion 64 of the component "C" to manufacture or form the component "C". As shown in FIGS. 6-9, the apparatus 10 may include a directed energy source 80 and a beam directing mechanism 82. The directed energy source 80 may be operable to produce an energy beam effective to fuse the metallic powder "P" to the end portion 64 of the metallic component "C". For example, the directed energy source 80 may be any device operable to generate a beam of suitable power and other operating characteristics to fuse the metallic powder "P" during a manufacturing process. In some embodiments, the directed energy source 80 may be a laser having an output power density having an order of magnitude in a range of about 10-100 kW/mm^2. Other directed-energy sources such as electron beam emitters are suitable alternatives to a laser.

The beam directing mechanism 82 may be operable to direct the energy beam of the directed energy source over the metallic powder "P" in the powder bed 60 in a pattern corresponding to a new cross-sectional layer of the metallic component "C", as shown in FIG. 8. As also depicted in FIG. 8, the beam directing mechanism 82 may include at least one movable mirror, prism, and/or lens operable so that a beam "B" produced by the directed energy source 80 can be focused to a desired focal spot "S" and steered to a desired position in an appropriate pattern in an plane on the metallic powder "P" in the powder bed 60. In this way, the directed energy source 80 and the beam directing mechanism 82 may be used to fuse the metallic powder "P" over the end portion 64 onto the component "C" as a two-dimensional cross-section or layer. The beam "B" may thereby heat the pattern of metallic powder "P" to a fusion temperature that causes the metallic powder "P" to melt, flow, and consolidate (referred to herein as "fusing" (or grammatical equivalents thereof) the metallic powder "P").

As shown in FIG. 6, a method of manufacturing a component "C" with the apparatus 10 may include translating the component "C", such as via the component translating mechanism 32, with respect to the build plate 26 such that the end portion 64 of the component "C" is positioned within the aperture 38 (potentially below the build surface 36) and in engagement with the seal 28. The aperture 38 of the build plate 26, the seal 28 and the end portion 64 of the component "C" may cooperate to form the powder bed 60 for holding the metallic powder "P". During such a condition, the powder supply mechanism 18 may expose metallic powder "P", as also shown in FIG. 6. With metallic powder "P" exposed, the powder translating mechanism 20 may then fill the powder bed 60 by depositing the exposed metallic powder "P" through the aperture 38 and over the seal 28 and the end portion 64 of the component "C", as shown in FIG. 7. The powder bed 60 may thereby form a layer of metallic powder "P" over or on the end portion 64 of the component "C". As noted above, in one example the thickness of the layer of metallic powder "P" over or on the end portion 64 of the component "C" is within the range of 30 microns to 50 microns.

Once metallic powder "P" is deposited within the powder bed 60 and a layer of metallic powder "P" is thereby formed over or on the end portion of the component "C", as shown in FIG. 8 the directed energy source 80 and the beam directing mechanism 82 may direct a beam B of energy to the layer of deposited metallic powder "P" in a pattern to fuse the metallic powder "P" to the end portion 64 on the component "C" as a new cross-sectional layer. After the new cross-sectional layer is formed on the end portion 64 of the component "C", the external heat control mechanism 30 is used to form a temperature profile of at least the newly formed cross-sectional layer to prevent cracking. Also after the new cross-sectional layer is formed on the end portion 64 of the component "C", and potentially during or part of the formation of the temperature profile of at least the newly formed cross-sectional layer, the component "C" may be translated with respect to the build plate 26 and the external heat control mechanism 30 by the component translating mechanism 32, as shown in FIG. 9. The component "C" may be translated to a lower position in the powder bed 60 such that the end portion 64 of the component "C" with the newly formed layer is positioned within the aperture 38 (potentially below the build surface 36) and in engagement with the seal 28, as shown in FIG. 9. The component "C" may then be in a condition for deposition and fusion of metallic powder "P" in the powder bed 60 to form another layer on the end portion 64 of the component "C". In this way, translating the component "C", depositing the metallic powder "P", fusing the metal powder "P" layer on the end portion 64 of the component "C", and forming the temperature profile of the end portion 64 may form a cycle that may be performed a plurality of times to manufacture or form the metallic component "C" in a cross-sectional layer by cross-sectional layer fashion.

The apparatus 10 and methods described above may be used to construct all or part of a component "C", potentially in combination with other methods. For example, to construct all of a component "C" via the apparatus 10 and methods described above, a seed component may initially be utilized for the formation of a first layer thereon. In other embodiments, to construct part of a component "C" via the apparatus 10 and methods described above the layers may be formed on a preexisting partially formed component "C".

In some embodiments, the component "C" may be a turbine component, such as a turbine blade. In some such turbine blade embodiments, the layers may be formed on a turbine blade base portion from the metallic powder "P" to form a tip and/or tip portion of the turbine blade. In some such embodiments, the turbine blade base portion may be formed by removing a preexisting tip and/or tip portion from the turbine blade base portion. In other embodiments, the turbine blade base portion may also be formed from layers of the metallic powder "P" or formed by another manufacturing process. For example, a turbine blade base portion, which may include at least one of a dovetail, a shank, a platform, and a root, may be manufactured using a conventional casting process. At least a tip and/or a tip portion of an airfoil (or the entirety of the airfoil) may be formed on such a turbine blade base portion in a layer by layer fashion using the additive manufacturing apparatus 10 and methods described herein.

A turbine blade tip, tip portion and base portion, as used herein, may be of any configuration and may include any shape and/or design. The apparatus 10 and methods described herein may form any of a turbine blade tip, tip portion and base portion from the layers of powder "P." As noted above, the term "end portion 64" is used herein to refer generally to the free end and a portion proximate thereto of a component "C" at a particular point in time during a manufacturing process. As the component "C" is built up layer by layer, the end portion 64 evolves over time. For example, if a component "C" being formed by the apparatus 10 is a turbine blade or portion thereof, the end portion 64 at a first point in time during the manufacturing process of the turbine blade component "C" may be a base portion of the resulting blade (e.g., a radially inner portion of the resulting blade). At a second point in time in the manufacturing process subsequent to the first point in time, the end portion 64 of the turbine blade component "C" may be a tip portion of the resulting blade (e.g., a radially outer portion of the blade, such as an airfoil). At a third point in time in the manufacturing process subsequent to the second point in time, the end portion 64 of the turbine blade component "C" may be a tip of the resulting blade (e.g., a radially outermost portion or end of the blade, such as an tip cap, squealer tip, etc). In this way, the end portion 64 of a turbine blade component "C" at a particular point in time may be any fraction of the resulting blade. Simply stated, the terms "tip portion" and "end portion" are not used herein to refer to a location or position of the resulting component "C" formed by the apparatus 10, but rather to refer to the free end and a portion proximate thereto of the component "C" during a particular time in the manufacturing process of the component "C."

The layers of a component "C" formed by the additive manufacturing apparatus 10 and methods described herein need not have a homogenous metal alloy composition. For example, the composition of the layers formed by the metallic powder "P" of the apparatus 10 may be varied by changing the composition of the powder "P" during the additive manufacturing process, to produce varying layers or sections of the component "C". For example, a base portion of an airfoil portion of a turbine blade component "C" may be formed by layers of a first metallic powder alloy composition, and a tip portion of the airfoil portion may be formed by layers of a second metallic powder alloy composition. For example, the second metallic powder alloy composition used for the formation of the tip portion of the airfoil portion may have a greater oxidation resistance than the second metallic powder alloy composition used for the base portion of the airfoil portion.

The additive manufacturing apparatus 10 and methods disclosed herein may form, at least in part, any article, component or structure for use in high temperature applications. For example, the apparatus and methods disclosed herein may form, at least in part, a turbine blade, combustor, shroud, nozzle, heat shield and/or vane.

The foregoing has described apparatus and corresponding methods for layered manufacturing of metal alloy components. All of the features disclosed in this specification (including any accompanying claims, abstract and drawings), and/or all of the steps of any method or process so disclosed, may be combined in any combination, except combinations where at least some of such features and/or steps are mutually exclusive.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to define the parameters of the disclosure, they are by no means limiting and are exemplary embodiments. Many other embodiments will be apparent to those of ordinary skill in the art upon reviewing the above description. The scope of the disclosure should, therefore, be determined with reference to the appended claims, along with the full scope of equivalents to which such claims are entitled.

In the appended description, the terms "including" and "in which" are used as the plain-English equivalents of the respective terms "comprising" and "wherein." Moreover, in the following claims, the terms "first," "second," etc. if any, are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the disclosure, including the best mode, and also to enable any person of ordinary skill in the art to practice the embodiments of disclosure, including making and using any devices or systems and performing any incorporated methods. The patentable scope of the disclosure is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

While the invention has been described in detail in connection with only a limited number of embodiments, it should be readily understood that the invention is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the invention have been described, it is to be understood that aspects of the disclosure may include only some of the described embodiments. Accordingly, the disclosure is not to be seen as limited by the foregoing description, but is only limited by the scope of the appended claims.

The invention claimed is:

1. An apparatus for manufacturing a component or portion thereof, comprising:
    a build plate including a build surface, a bottom surface and an aperture extending through the build plate between the bottom surface and the build surface;
    an actuator operable to translate the component with respect to the build plate such that an end portion of the component is positioned within the aperture of the build plate and below the build surface;
    a seal coupled within the aperture of the build plate and configured to engage the end portion of the component; and
    an external heat control mechanism positioned proximate to the bottom surface of the build plate and operable to form a predetermined temperature profile of the end portion to prevent cracking of the component,
    wherein the aperture of the build plate, the seal, and the end portion of the component cooperate to form a powder bed configured to hold powder of a predetermined composition therein.

2. The apparatus of claim 1, wherein the aperture of the build plate includes a first cross-section that defines an area that is not greater than 135% of an area defined by a second cross-section of the end portion of the component.

3. The apparatus of claim 1, wherein the external heat control mechanism is in a fixed positional relationship with respect to the build plate.

4. The apparatus of claim 1, wherein the build plate is non-metallic.

5. The apparatus of claim 1, further comprising a temperature feedback mechanism that controls the temperature of the end portion via the external heat control mechanism according to the temperature profile.

6. The apparatus of claim 5, wherein the temperature feedback mechanism comprises a temperature measuring device that measures the temperature of the end portion.

7. The apparatus of claim 1, wherein the seal seals off the aperture with respect to at least the powder within the powder bed.

8. The apparatus of claim 1, further comprising a directed energy source operable to produce an energy beam suitable for fusing the powder in the powder bed on the end portion of the component.

9. The apparatus of claim 8, further comprising a beam directing mechanism operable to direct the energy beam over the powder in a pattern corresponding to a cross-sectional layer of the component.

10. The apparatus of claim 1, further comprising an airtight build enclosure forming a substantially oxygen-free atmosphere, wherein at least the powder bed is positioned within the substantially oxygen-free atmosphere.

11. The apparatus of claim 1, further comprising:
    a source of the powder of the predetermined composition; and
    a transfer mechanism operable to transfer powder from the source and substantially fill the powder bed with the powder.

12. The apparatus of claim 1, wherein the external heat control mechanism comprises at least one induction coil extending about the component when the component is positioned within the aperture.

13. The apparatus of claim 12, wherein the build plate is formed of an electrical insulating material that is operable to prevent the at least one induction coil from heating the build plate to a sintering temperature of the powder.

14. The apparatus of claim 1, wherein the component is a turbine blade.

15. The apparatus of claim 1, further comprising an airtight build enclosure forming an inert atmosphere.

16. The apparatus of claim 1, further comprising an airtight build enclosure forming a reducing atmosphere.

17. The apparatus of claim 1, further comprising a build enclosure comprising a first airtight zone and a second zone in communication with the first airtight zone, the second zone not being airtight.

18. The apparatus of claim 1, wherein the powder of the predetermined composition is a superalloy composition.

19. The apparatus of claim 1, wherein the powder of the predetermined composition is a Co-based, Ni-based, Ti-based, or Fe-based composition.

20. The apparatus of claim 1, wherein the external heat control mechanism comprises a magnetic material.

* * * * *